… … …

3,180,713
REMOVAL OF ORGANIC MATTER FROM AMMONIUM SULFATE WITH MIXED SOLVENTS
Roy B. Flay, Concord, Calif., assignor to California Research Corporation, San Francisco, Calif., a corporation of Delaware
No Drawing. Filed July 27, 1962, Ser. No. 213,041
4 Claims. (Cl. 23—312)

This invention relates to a method of purifying ammonium sulfate. More particularly, this invention relates to a method of purifying ammonium sulfate obtained by the neutralization of sulfuric acid waste liquors.

Sulfuric acid provides a method for separating xylene monomers. Patents have issued demonstrating the separation of m-xylene and p-xylene by sulfonation with sulfuric acid and subsequent hydrolysis of the sulfonate. See, for example, U.S. Patent No. 2,943,121. The sulfuric acid which remains creates a serious problem for disposal. However, rather than disposing of it as sewage, it may be used advantageously for a source of sulfate in the formation of ammonium sulfate. Ammonium sulfate finds widespread use as a fertilizer.

The sulfuric acid waste liquor, however, contains significant amounts of organic materials. The organic materials are mostly present in the form of arylsulfonates, particularly xylenesulfonates. The presence of the arylsulfonates interferes with the crystallization of the ammonium sulfate and imparts an offensive color and odor to the product. By virtue of the hydrotropic character of the arylsulfonates present in the waste liquor, they are particularly difficult to remove.

It has now been found that the arylsulfonates may be almost totally removed by extracting the ammoniated sulfuric acid waste liquor or ammonium sulfate liquor with a mixed solvent containing aliphatic alcohols in the range of $C_8$–$C_{12}$ and a mixed aromatic solvent containing $C_7$–$C_9$ hydrocarbons. Decyl alcohol is preferred and is available from the OXO process and is a mixture of mostly $C_{10}$ alcohols. It is preferred that the weight ratio of alcohol to aromatics be approximately 1:1, although the amount of alcohol may be as low as 1 part to 3 parts of the aromatic solvent.

The amount of the mixed solvent to be used will depend on the amount of xylenesulfonate present. The xylenesulfonate may be as high as 35% by weight of the ammoniated waste liquor, but will rarely exceed that amount. The amount of solvent should be at least 2 parts to every part xylenesulfonate and preferably 4 parts to 1 part and higher, probably not greater than 20 to 1. Moreover, the mixed solvent should not be less than 25% by weight of the ammoniated waste liquor. Preferably, the weight ratio of solvent to ammoniated waste liquor is at least 1:2 and may be as high as 2:1. Particularly preferred is a ratio of 1:2 to 1:1.

The temperature for the extraction should be sufficiently high to maintain all the ammonium sulfate in solution. Temperatures in excess of 110° F. are satisfactory and temperatures in the range of 125° to 185° F. are preferred.

The time for the extraction is not critical, the extraction being complete usually in a few minutes. The time will depend on the efficiency with which the two liquids are interspersed, the amount of xylenesulfonate in the ammoniated sulfuric acid liquor, the amount of mixed solvent used, etc. While a single extraction is usually sufficient, multistage extractions may be used. However, it is still necessary to use the amounts of mixed solvent previously designated. Because of the hydrotropic nature of the xylenesulfonates, it is found that, with smaller amounts of solvent, the amount of water which dissolves in the mixed solvent is high enough to carry a significant amount of ammonium sulfate into the organic phase. Moreover, as less of the mixed solvent is used, the separation of the two liquids into two distinct phases becomes more difficult.

During the extraction, it is preferred that the pH be maintained on the acid side, preferably in the range of about 2 to about 5. While a pH of approximately neutral, i.e., 7, is operable, at a neutral pH, separation of the two liquids into distinct phases is slow and sometimes not complete.

The mixed solvent used in this invention may be recovered and reused by extracting the mixed solvent with water to remove the arylsulfonates. The nature of the mixed solvent minimizes losses to the aqueous layer. Moreover, it permits a relatively quantitative removal of the arylsulfonates into the aqueous layer. By regenerating the solvent by removal of the arylsulfonates, the amount of solvent necessary for this process, when carried out in a continuous manner, may be minimized and the same solvent used repeatedly.

Either batch or continuous processes may be used. Such continuous methods as counterflow extraction are well known in the art.

By virtue of this process, a convenient way is also provided for isolating the arylsulfonate, particularly xylenesulfonates. In view of its hydrotropic nature, this material finds use in increasing the solubility of organic materials in water.

The process of this invention is illustrated by the following examples.

EXAMPLE I

Ammoniated sulfuric acid waste liquor, containing 42.6 grams of ammonium sulfate, 9.0 grams of ammonium xylenesulfonates, and 48.4 grams of water, was extracted with 60 grams of a mixed solvent having a decyl alcohol to aromatic solvent ratio of about 1:1, the aromatic cut boiling in the range of approximately 300° to 350° F. The temperature was maintained in a range of about 130° to 170° F. while the pH was approximately 3. After shaking the mixture for 3 minutes, the mixture was allowed to stand until the phases separated. The lower phase was then withdrawn and the two phases were analyzed. The raffinate weighed 91.8 grams and had only 1.6% by weight of ammonium xylenesulfonate. This was an efficiency of 82%. Only a negligible amount of ammonium sulfate was found in the extract solvent while only a negligible amount of the solvent was lost to the raffinate.

The following table illustrates a number of examples carried out according to the above process.

Table I

| Ammoniated Sulfuric Acid, Percent By Weight | | Solvent, Gms. | Raffinate, Gms. | Raffinate Analysis, Percent By Weight | | Extraction Efficiency, Percent | $(NH_4)_2SO_4$ Loss, Gms. | Solvent Recovered, Gms. |
|---|---|---|---|---|---|---|---|---|
| AXS | $(NH_4)_2SO_4$ | | | AXS | $(NH_4)_2SO_4$ | | | |
| 2.3 | 47.3 | 40 | 93.9 | 0.1 | 48.2 | 95 | 0.4 | 39.6 |
| 2.3 | 47.3 | 60 | 99.7 | 0.1 | 48.0 | 95 | 0.4 | 58.6 |
| 2.3 | 47.3 | 85 | 97.1 | 0.1 | 49.2 | 95 | 0.6 | 83.2 |
| 9.0 | 42.6 | 40 | 90.2 | 1.8 | 46.4 | 80 | 1.2 | 39.5 |
| 9.0 | 42.6 | 100 | 92.5 | 1.9 | 47.0 | 79 | 0.8 | 101.3 |
| 15.1 | 39.7 | 40 | 77.0 | 2.9 | 42.2 | 81 | 4.4 | 38.4 |
| 15.1 | 39.7 | 70 | 78.0 | 2.5 | 43.4 | 84 | 2.6 | 71.0 |
| 15.1 | 39.7 | 100 | 79.5 | 2.7 | 43.1 | 82 | 2.1 | 101.8 |
| 19.4 | 36.0 | 40 | 65.6 | 1.7 | 42.8 | 91 | 6.2 | 38.2 |
| 19.4 | 36.0 | 80 | 70.0 | 2.1 | 42.9 | 89 | 4.0 | 81.6 |
| 19.4 | 36.0 | 100 | 73.5 | 2.6 | 42.4 | 87 | 3.1 | 102.0 |

It is evident from the table that, by using the mixed solvent of this invention, the xylenesulfonate present in the ammonium sulfate liquor may be almost completely removed with only minor losses of the extracting solvent or ammonium sulfate. Further extractions would permit further removal of the minor amount of the xylenesulfonate still present in the ammonium sulfate liquor.

As will be evident to those skilled in the art, various modifications on this process can be made or followed, in the light of the foregoing disclosure and discussion, without departing from the spirit or scope of the disclosure or from the scope of the following claims.

I claim:

1. A method of purifying ammonium sulfate obtained from an ammouniated sulfuric acid waste liquor derived from the separation of meta- and para-xylene by sulfuric acid containing arylsulfonate which comprises extracting from the ammoniated waste liquor said arylsulfonate with a mixed solvent containing $C_8$–$C_{12}$ aliphatic alcohols and an aromatic mixture of $C_7$–$C_9$ hydrocarbons in a weight ratio of about 1:1 to 1:3 at a temperature in excess of 110° F., wherein the weight ratio of mixed solvent to arylsulfonate present in said ammouniated sulfuric acid waste liquor is at least 3:1, and isolating the purified ammonium sulfate.

2. A process according to claim 1, wherein the pH of the ammoniated waste liquor is in the range of 2 to 5.

3. A process according to claim 2, wherein the ratio of decyl alcohols to aromatic solvent is about 1:1.

4. A process according to claim 1, wherein the weight ratio of mixed solvent to arylsulfonate present in the ammoniated sulfuric acid waste liquor is at least 4:1, and at least 25% by weight of the waste liquor.

References Cited by the Examiner

UNITED STATES PATENTS

| | | | |
|---|---|---|---|
| 1,966,729 | 7/34 | Loomis | 23—312 X |
| 2,048,521 | 7/36 | Shepard | 208—274 |
| 2,295,065 | 9/42 | Vesterdal | 208—274 X |
| 2,303,077 | 11/42 | Giraitis | 208—274 X |
| 2,331,235 | 10/43 | Ruys | 23—119 |
| 2,754,192 | 7/56 | Bray | 23—119 X |
| 3,013,860 | 12/61 | Jones | 23—119 |

NORMAN YUDKOFF, *Primary Examiner.*